US008045964B2

(12) United States Patent
Onishi et al.

(10) Patent No.: US 8,045,964 B2
(45) Date of Patent: Oct. 25, 2011

(54) INFORMATION DISTRIBUTION SYSTEM, INFORMATION DISTRIBUTION SERVER, MOBILE TERMINAL, AND INFORMATION DISTRIBUTION METHOD

(75) Inventors: Keisuke Onishi, Tokyo (JP); Shin Kikuchi, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 527 days.

(21) Appl. No.: 10/582,852

(22) PCT Filed: Nov. 26, 2004

(86) PCT No.: PCT/JP2004/017591
§ 371 (c)(1),
(2), (4) Date: Jun. 14, 2006

(87) PCT Pub. No.: WO2005/060279
PCT Pub. Date: Jun. 30, 2005

(65) Prior Publication Data
US 2007/0054672 A1    Mar. 8, 2007

(30) Foreign Application Priority Data

Dec. 17, 2003   (JP) ................................. 2003-420174

(51) Int. Cl.
*H04M 3/42*   (2006.01)
(52) U.S. Cl. ............... 455/414.1; 455/456.1; 455/456.2; 455/456.3
(58) Field of Classification Search .................. 455/414, 455/456.1–456.3
See application file for complete search history.

(56) References Cited

U.S. PATENT DOCUMENTS

| 5,802,492 A | 9/1998 | DeLorme et al. |
| 2001/0019960 A1* | 9/2001 | Takayama et al. ............. 455/456 |
| 2002/0115437 A1 | 8/2002 | Fukui et al. |
| 2002/0156578 A1 | 10/2002 | Kondou et al. |
| 2003/0198346 A1 | 10/2003 | Meifu et al. |

(Continued)

FOREIGN PATENT DOCUMENTS

EP    1355470 A2    10/2003

(Continued)

OTHER PUBLICATIONS

Japanese Office Action dated Dec. 18, 2007, issued in corresponding Japanese Patent Application No. 2003-420174.

(Continued)

*Primary Examiner* — Kamran Afshar
*Assistant Examiner* — Omoniyi Obayanju
(74) *Attorney, Agent, or Firm* — Westerman, Hattori, Daniels & Adrian, LLP

(57) ABSTRACT

There is provided an information distribution system capable of distributing a content to a mobile terminal in a predetermined area, distributing content guide information to the mobile terminal, and distributing the content selected by the mobile terminal, within the area. The information distribution system includes an information distribution server, a mobile terminal, and a content DB. The content DB contains content information to be provided to the mobile terminal and information on the area to which the content is provided. The information distribution server distributes the content guide information to the mobile terminal. According to this content guide information, the mobile terminal performs a content distribution request. The information distribution server judges the position of the mobile terminal according to position judgment means. When the mobile terminal is in the distribution area of the content requested, the content is downloaded.

5 Claims, 8 Drawing Sheets

U.S. PATENT DOCUMENTS

2004/0059498 A1* 3/2004 Chinomi et al. ............. 701/200
2004/0077362 A1* 4/2004 Chinomi et al. ........... 455/456.5

FOREIGN PATENT DOCUMENTS

| | | |
|---|---|---|
| JP | 2000-205873 A | 7/2000 |
| JP | 2001-345749 A | 12/2001 |
| JP | 2002-99816 A | 4/2002 |
| JP | 2002-101467 A | 4/2002 |
| JP | 2002-145069 A | 5/2002 |
| JP | 2002-199449 A | 7/2002 |
| JP | 2002-245077 A | 8/2002 |
| JP | 2003-122656 A | 4/2003 |
| JP | 2003-150475 A | 5/2003 |
| JP | 2003-207353 A | 7/2003 |
| JP | 2003-296212 A | 10/2003 |
| JP | 2003-296358 A | 10/2003 |
| JP | 2003-319435 A | 11/2003 |
| WO | 98/08314 A1 | 2/1998 |

OTHER PUBLICATIONS

International Search Report mailed Mar. 8, 2005 of International Application PCT/JP2004/017591.

Supplementary European Search Report dated Jun. 20, 2011, issued in corresponding European Patent Application No. 04820504.

* cited by examiner

INFORMATION DISTRIBUTION SYSTEM, INFORMATION DISTRIBUTION SERVER, MOBILE TERMINAL, AND INFORMATION DISTRIBUTION METHOD

TECHNICAL FIELD

The present invention relates to an information distribution system and, information distribution server, a mobile terminal and an information distribution method for distributing information to a mobile terminal such as a mobile telephone or PDA, and more particularly, to an information distribution system, an information distribution server, a mobile terminal and an information distribution method, whereby the information distribution server is equipped with a content database that associates and memorizes content downloadable to a mobile terminal, or content data indicating the registration location of such content, and area information indicating the specific area to which such content may be downloaded by the mobile terminal, so that when user bearing the mobile terminal moves into a particular area, specific content associated with the area information in question is distributed to the mobile terminal.

RELATED ART

In light of the remarkable progress in telecommunications technology and information processing technology in recent years, it has become possible for users of computers installed in businesses and homes to access, via Internet networks, servers and websites offering all kinds of data communication services and to obtain desired public information or receive desired services. Moreover, the Internet now serves as an effective business tool in various ways, as business enterprises, such as stores, eating and drinking establishments as well as local government bodies, etc., now use it to transmit messages or offer their services via their websites to clients and customers. In addition, banks can now offer their banking services via the Internet while certain firms can offer mail order marketing services and so forth.

Further, the range of such data communication services has recently expanded to include not only terminals such as stationary computer devices in businesses and homes, but also mobile terminals that people can carry on their person. Data communication services provided by mobile telephones are a typical instance, and information communication services allowing mobile telephones to connect with various information distribution computer systems via wireless communication networks so as to receive desired information (content) through downloading and be saved in the mobile terminal are now available in a variety of fields. Recently, navigation services that offer real-time route guidance to destinations have also become available.

When visiting a place in an unfamiliar area people have been accustomed to rely on an atlas or similar reference material to locate roads, landmarks and addresses depicted in the maps in question. Or, in a vehicle equipped with a car navigation system (below, "CNS"), travelers are assisted in reaching their destination by running the CNS and entering the destination name, upon which they obtain guidance information displayed on a monitor screen and/or delivered as audio output (navigation information).

The principle of operating the CNS involves the Global Positioning System ("GPS"), whereby a vehicle equipped with CNS receives through a GPS antenna GPS signals transmitted from multiple GPS satellites in flight above the earth, and fixes its own position by analyzing data on the satellites' positions, data on the distance between the satellites and the receiver, and clock data, etc., that are contained in such GPS signals. The GPS satellites must be at least four in number. By itself, the GPS generally fixes a certain position with an accuracy of slightly over 10 m, but if DGPS (Differential GPS) is available, such position-fixing accuracy can be enhanced by 5m or less.

As mentioned above, recent years have seen great strides of improvement in the capabilities of mobile telephones, Personal Handyphone System ("PHS") devices and other mobile communication terminal equipment, which are progressively becoming more multifunctional. In particular, aside from the basic telephone communication function their data communication functions have significantly increased, so that via the Internet they can now offer various kinds of data communication services to their users. One of these is route navigation service, and attempts are underway to provide not only drivers of automobiles, but users of mobile telephones as well with route guidance from their present location to a certain destination.

The present inventors have already disclosed in Japanese Laid-Open Patent Publication No. 2003-214860 (hereinafter "Patent Document 1") a navigation system that uses a mobile telephone as terminal. As shown in FIG. 8, this navigation system is composed of a mobile terminal (mobile telephone) 1 connected to a mobile communications network 2, and a data communication service center (information distribution computer system) 3, where the mobile terminal 1 receives desired data communication services by connecting to the data communication service center 3. Where the mobile terminal 1 is a mobile telephone or PHS, telephone calls can be made to desired recipient terminals (fixed-line telephones, mobile telephones, PHSs, etc) through mobile communications base stations or telephone line networks, via the mobile communication network 2. As described below, the data communication service center 3 is configured to implement route navigation services in response to requests made by the mobile terminal 1.

In particular, when a route search request containing positional information on the starting point and destination location is issued from the mobile terminal 1, the information distribution computer system of the data communication service center 3 uses road data stored in a storage means to find the optimal route from the starting point to the destination location, and temporarily stores data on the route found into the storage means, as guidance route data. When the mobile terminal 1 makes a display map data request specifying positional coordinates and a guidance route, the information distribution computer system of the data communication service center 3 reads out the map data for a vector-style map display of the area around the specified positional coordinates and data for the specified guidance route from the storage means, then converts such guidance route data into vector data to depict roads in particular colors and incorporates the same into the map data, which are then transmitted to the mobile terminal 1, the source of the request.

The mobile terminal 1 is equipped with a GPS receiver (not shown FIG. 8), for fixing its present position during motion, and carries out GPS position-fixing at particular intervals. If the results of GPS position fixing yield some inadequacy, this will arise in the display map information, and the mobile terminal 1 will issue a request for display map information to the information distribution computer system of the data communication service center 3. Further, such information distribution computer system is provided with a storage means, in which road data (map data) and data on buildings and other landmarks, intersections and street names, etc., at various locations indicated in the maps, are stored. Such data are updated and maintained through information distribution computer systems 5, 6 or similar systems that implement distribution of maps via an Internet network 4.

As the recipients targeted by data communication services shift from using stationary computer devices to portable terminals, service providers which take advantage of the features of moving terminal devices have become in demand. From the point of view of users, it is the convenience of being able to access any desired servers and websites and receive particular services at any time regardless of their location, while service providers value the benefits derived from attracting users who are in motion, or the increased appeal to users because of the availability of specific information services when they are situated in certain areas.

For example, it is possible to attract users and achieve differentiation from rivals by providing people who may be in a restaurant, theme park, or tourist spot, with information (content) that can be obtained only where they are located, through their mobile terminals. This kind of service has been proposed for the advertising sector. For instance, in Japanese Laid-Open Patent Publication No. 2003-99670 (see FIG. 1, hereinafter "Patent Document "2"),the possibility of displaying advertisements prepared by advertising entities existing within the neighboring area of the current location of the mobile object (vehicle) such as a bus, through the receiving terminal installed in the mobile object, has been disclosed.

The technology disclosed in Patent Document 2 comprises a mobile object equipped with a content receiving display terminal, advertising entities that post digital content to such mobile object, and a content distribution site that is connected to the Internet and stores, manages, and distributes such content to the mobile object via a wireless distribution network. The content receiving display terminal has a position detection means that employs a position information detection service to output current position information, while the content distribution site is equipped with means for managing the settings pertinent to the distribution conditions, including distribution target areas, periods and time zones corresponding to the content prepared by advertisers. The content receiving display terminal sends position information and mobile object information to the content distribution site at predetermined times and the content distribution site then receives the position information, utilizes such position information and the distribution conditions and current time information as criteria to select the content to be distributed, and transmits it for display.

DISCLOSURE OF INVENTION

In Patent Document 1, the technology disclosed pertains to the display of advertisements or other content to an unspecified number of people in vehicles, which is not without disadvantages, specifically in the case where its application is intended for a data communication service targeting mobile terminals carried by individuals. First, the advertisement information or other content is distributed one-way and displayed by mobile objects situated within the area, and users receiving the content may be unnecessarily inconvenienced as they are not at liberty to choose whether to download or reject such content, if it is not useful.

Secondly, vehicles located outside the area in question cannot access or are otherwise unable to find out such information content that may be unique to the area. In other words, individual users will only find out the existing content provided in a specific area only as they enter the area, and thus there would be no means of attracting the attention of users situated outside such area and draw them thereto.

As a result of numerous and varied investigations, the present inventors found that by equipping a system with a content database that associates and memorizes content downloadable to a mobile terminal, or content data indicating the registration location of such content, and area information indicating the specific area to which such content may be downloaded by the mobile terminal, and by configuring the system in such manner that guidance information on the content downloadable by the mobile terminal is distributed to the mobile terminal, and that when the user carrying the mobile terminal moves into a specific area and the distribution conditions are complied with, specific content associated with the area information in question will be distributed to the mobile terminal in response to a distribution request from the mobile terminal, the aforementioned disadvantages can be eliminated.

Thus, the present invention aims to provide an information distribution system/method equipped with a content database that associates and memorizes content downloadable to a mobile terminal, or content data indicating the registration location of such content, and the specific area to which such content may be downloaded by the mobile terminal, distributes to the mobile terminal guidance information on the content that the mobile terminal can download, and distributes the content data after determining that the position of the mobile terminal matches the area information.

MEANS TO RESOLVE THE PROBLEMS

With the objective of resolving said problems the present invention relates to an information distribution system that comprises an information distribution server and a mobile terminal, where:

the information distribution server is equipped with a content database that associates and memorizes content downloadable to a mobile terminal, or content data indicating the registration location of such content, and area information indicating the specific area to which such content may be downloaded by the mobile terminal and the information distribution server is equipped with:

a content guide information distribution means that transmits guidance information to the mobile terminal on the content downloadable by the mobile terminal;

a distribution request reception means that receives content distribution requests from the mobile terminal;

a position judgment means that determines the position of the mobile terminal; and a distribution enabled/disabled decision means that checks the position of the mobile terminal as determined by the position judgment means against the area information associated with the content whose distribution is requested and decides whether to distribute the content data in question;

and where the mobile terminal is equipped with:

a position information transmission means that sends information on the current position of the mobile terminal to the information distribution server; and a distribution request means that makes distribution requests to the information distribution server and selects content to be downloaded according to the content guide information distributed by the information distribution server;

and the system is configured in such manner that if the area information associated with the content whose distribution is requested matches the position of the mobile terminal, the information distribution server transmits the content data in question to the mobile terminal.

The present invention also pertains to the information distribution system of the present invention, wherein the position information transmission means is composed of a current position detection means and a current position information transmission means that transmits current position information generated by the current position detection means, and where the position judgment means determines the current position of the mobile terminal according to current position information received from the mobile terminal in question.

The present invention also relates to an information distribution system that comprises an information distribution server and a mobile terminal, where:

the information distribution server is equipped with a content database that associates and memorizes content downloadable to the mobile terminal, or content data indicating the registration location of such content, and area information indicating the specific area to which such content may be downloaded by the mobile terminal, and the information distribution server is equipped with:

a distribution request reception means that receives content distribution requests from the mobile terminal;

a route search means that carries out route searches according to route search requests sent from the mobile terminal; and a route search result transmission means that transmits the results of the route searches to the mobile terminal;

and where the mobile terminal is equipped with:

a current position detection means that detects the current position of the mobile terminal;

a current position information transmission means that transmits current position information generated by the current position detection means:

a route search request transmission means that transmits route search requests to the information distribution server;

a distribution request means that makes distribution requests to the information distribution server and selects content to be downloaded according to the content information distributed by the information distribution server; and a reception means that receives content data from the information distribution server;

and the system is configured in such manner that if the results of a route search conducted by the route search means show that the mobile terminal is passing through an area that matches the area information, said information distribution server will, via the route search result transmission means, add the content guide information matching the area information to the route search results as a download point, and transmit the same.

The present invention also relates to an information distribution server equipped with a content database that associates and memorizes content downloadable to a mobile terminal, or content data indicating the registration location of such content, and area information indicating the specific area to which such content may be downloaded by the mobile terminal, and distributes the content data requested by the mobile terminal and the information distribution server is equipped with:

a content guide information transmission means that transmits terminal guide information to the mobile terminal on the content downloadable by the mobile terminal;

a distribution request reception means that receives content distribution requests from the mobile terminal;

a position judgment means that determines the position of the mobile terminal; and a distribution enabled/disabled decision means that checks the position of the mobile terminal as determined by the position judgment means against the area information associated with the content whose distribution is requested and decides whether to distribute the content data in question;

and the information distribution server is configured in such manner that if the area information associated with the content whose distribution is requested matches the position of the mobile terminal, the information distribution server transmits the content data in question to the mobile terminal.

The present invention also relates to the information distribution server of the present invention, with the further features that the information distribution server is equipped with a current position information reception means that receives current position information generated by the mobile terminal according to the output of the current position detection means, and the position judgment means determines the current position of the mobile terminal according to current position information received from the mobile terminal in question.

The present invention further relates to an information distribution server equipped with a content database that associates and memorizes content downloadable to a mobile terminal, or content data indicating the registration location of such content, and area information indicating the specific area to which such content may be downloaded by the mobile terminal, and distributes the content data requested by the mobile terminal and is further equipped with:

a current position information reception means that receives current position information sent by the mobile terminal;

a distribution request reception means that receives content distribution requests from the mobile terminal;

a route search means that carries out route searches according to route search requests sent from the mobile terminal; and a route search result transmission means that transmits the results of the route searches to the mobile terminal;

and the information distribution server is configured in such manner that if the results of a route search by the route search means show that the mobile terminal is passing through an area that matches the area information, the information distribution server will, via the route search result transmission means, add the content guide information matching the area information to the route search results as a download point, and transmit the same.

The present invention also relates to a mobile terminal that receives any desired content data from an information distribution server equipped with a content database that associates and memorizes content downloadable to a mobile terminal, or content data indicating the registration location of such content, and area information indicating the specific area to which such content may be downloaded by the mobile terminal;

where the mobile terminal is equipped with:

a position information transmission means that sends information on the current position of the mobile terminal to the information distribution server;

a distribution request means that makes distribution requests to the information distribution server and selects content to be downloaded according to the content guide information distributed by the information distribution server; and a receiving means that receives content data that is distributed to the mobile terminal when the information distribution server checks the position of the mobile terminal against the area information associated with the content whose distribution is requested and determines that the mobile terminal is situated in an area that matches the area information.

The present invention further relates to the mobile terminal of claim 7, wherein the position information transmission means is composed of a current position detection means and a current position information transmission means that transmits current position information generated by the current position detection means.

The present invention relates to a mobile terminal that receives any desired content data from an information distribution server equipped with a content database that associates and memorizes content downloadable to a mobile terminal, or content data indicating the registration location of such content, and area information indicating the specific area to which such content may be downloaded by the mobile terminal;

where the mobile terminal is equipped with:

a current position detection means that detects the current position of the mobile terminal;

a current position information transmission means that transmits current position information generated by the current position detection means:

a route search request transmission means that transmits route search requests to the information distribution server;

a distribution request means that makes distribution requests to the information distribution server and selects content to be downloaded according to the content guide information distributed by the information distribution server; and a reception means that receives content data from the information distribution server;

where the reception means is configured in such manner as to receive route search results to which the content guide information matching the area information has been added by the distribution server as a download point, in the case where the route search results show that user bearing the mobile terminal is passing through an area that matches the area information.

The present invention also relates to an information distribution method for distributing information between a mobile terminal and an information distribution server equipped with a content database that associates and memorizes content downloadable to the mobile terminal, or content data indicating the registration location of such content, and area information indicating the specific area to which such content may be downloaded by the mobile terminal, where the information distribution server is configured to execute the following steps:

a step in which guidance information on the content downloadable by the mobile terminal is distributed to the mobile terminal;

a step in which a content distribution request is received from the mobile terminal;

a step in which the position of the mobile terminal is determined;

a step in which the position of the mobile terminal as determined by the position judgment means is checked against the area information associated with the content whose distribution is requested and decision is made whether to distribute the content data in question; and a step in which the content data is distributed to the mobile terminal in accordance with the judgment result;

and the mobile terminal is configured to execute the following steps:

a step in which information on the current position of the mobile terminal is transmitted to the information distribution server; and a content guide information distributing step whereby content to be downloaded is selected according to the content guide information distributed by the information distribution server and a distribution request is made to the information distribution server.

The present invention further relates to the information distribution method of the present invention, wherein the mobile terminal further executes:

a step in which the current position of the mobile terminal is detected; and a step in which the current position information generated by the current position detection means is transmitted to the information distribution server;

and the information distribution server further executes:

a step in which the current position of the mobile terminal is determined according to the current position information received from the mobile terminal in question.

The present invention also relates to an information distribution method for distributing information between a mobile terminal and an information distribution server equipped with a content database that associates and memorizes content downloadable to the mobile terminal, or content data indicating the registration location of such content, and area information indicating the specific area to which such content may be downloaded by the mobile terminal;

where the information distribution server executes the following steps:

a step in which a content distribution request is received from the mobile terminal;

a step in which a route search is conducted according to the route search request sent from the mobile terminal; and a route search result transmission step in which the results of the route search are transmitted to the mobile terminal;

and the mobile terminal executes the following steps:

a step in which the current position of the mobile terminal is detected;

a step in which current position information generated by the current position detection means is transmitted;

a step in which a route search request is transmitted to the information distribution server;

a step in which content to be downloaded is selected according to the content information distributed by the information distribution server and a distribution request is made to the information distribution server; and a step in which content data is received from the information distribution computer device;

and the route search result transmission step includes the process by which the information distribution server will, via the route search result transmission means, add the content guide information matching the area information to the route search results as a download point, and transmit the same in the case where the route search results show that the user bearing the mobile terminal is passing through an area that matches the area information.

The present invention relates to an information distribution method that employs an information distribution server equipped with a content database that associates and memorizes content downloadable to a mobile terminal, or content data indicating the registration location of such content, and area information indicating the specific area to which such content may be downloaded by the mobile terminal, and distributes the content data requested by a mobile terminal;

where the information distribution server executes the following steps:

a content guide information distributing step in which guidance information on the content downloadable by the mobile terminal is distributed to the mobile terminal;

a step in which a content distribution request is received from the mobile terminal;

a step in which the position of the mobile terminal is determined;

a step in which the position of the mobile terminal as determined by the position judgment means is checked against the area information associated with the content whose distribution is requested and a decision is made whether to distribute the content data in question; and a step in which the content data is distributed to the mobile terminal in accordance with the judgment result.

The present invention relates to an information distribution method of claim 13, wherein the information distribution server executes a further step whereby current position information generated by the mobile terminal according to the output of the current position detection means is received, and the current position of the mobile terminal in question is determined according to the current position information received.

The present invention also relates to an information distribution method that employs an information distribution server equipped with a content database that associates and memorizes content downloadable to a mobile terminal, or content data indicating the registration location of such content, and area information indicating the specific area to which such content may be downloaded by the mobile terminal, and distributes content data requested by the mobile terminal;

where the information distribution server executes the following steps:

a step in which a content distribution request is received from a mobile terminal;

a step in which a route search is conducted according to the route search request sent from the mobile terminal; and a route search result transmission step in which the results of the route search are transmitted to the mobile terminal;

where the route search result transmission step includes the process by which the information distribution server will, via the route search result transmission means, add the content guide information matching the area information to the route search results as a download point, and transmit the same in the case where the route search results show that the mobile terminal is passing through an area that matches the area information.

EFFECTS OF THE INVENTION

In the information distribution systems of the invention, contents downloadable to a mobile terminal, or content data indicating the registration location of such content are associated with area information indicating the specific area to which such content may be downloaded by the mobile terminal and are memorized by the system in a content database, and an information distribution server distributes guidance information on the downloadable content to the mobile terminal. Hence, the user, that is, the possessor of the mobile terminal, can find out what data may be accessed from whatever source, regardless of the user's current location. Moreover, in response to a content distribution request from the mobile terminal, the information distribution server will only distribute such content data desired by the user, as it can determine, on the basis of the current position information pertaining to the mobile terminal in question that the mobile terminal is located within the area for which the information content whose distribution has been requested is available. Therefore, since the user will receive only desired content data, the inconvenience of receiving unwanted content data that is distributed one-way can be eliminated. Further, a mobile telephone or PHS can be used as a mobile terminal, or a mobile telephone equipped with GPS position-fixing means can be used.

The information distribution system of the invention is a system equipped with navigation service capability, in which an information distribution computer device conducts a route search in response to a route search request from a mobile terminal, and if the route search results show that the mobile terminal is passing through an area that matches the distribution conditions, then the content guide information matching the area information will be added to the route search results and transmitted as a download point via the route search result transmission means. Hence the mobile terminal can find out, as a part of the route search request, the existence of content that may be distributed in a specific area, and the user can download the same if he is interested.

In the present invention, an information distribution server and mobile terminal can be provided that will compose the information distribution systems of the present invention, whereby the user is able to find out what content can be distributed to him in certain areas, regardless of his current location. Moreover, since he will only receive desired content data, he will not be subject to the inconvenience of receiving unwanted content data distributed one-way, as in the case of prior art.

In the present invention, an information distribution server and mobile terminal can be provided that will compose the information distribution system of the present invention, whereby the mobile terminal can find out, as a part of route search requests, the existence of content that may be distributed in a specific area, and the user can download the same if he is interested.

In the present invention, information distribution methods (download methods) that utilize the information distribution systems of the present invention can be provided with an information distribution method (download method) that utilizes the information distribution system can be provided.

In the present invention, the information distribution methods for the information distribution servers can be provided, while in an information distribution method for the information distribution server can be provided.

BEST MODE FOR CARRYING OUT THE INVENTION

Figure 1:
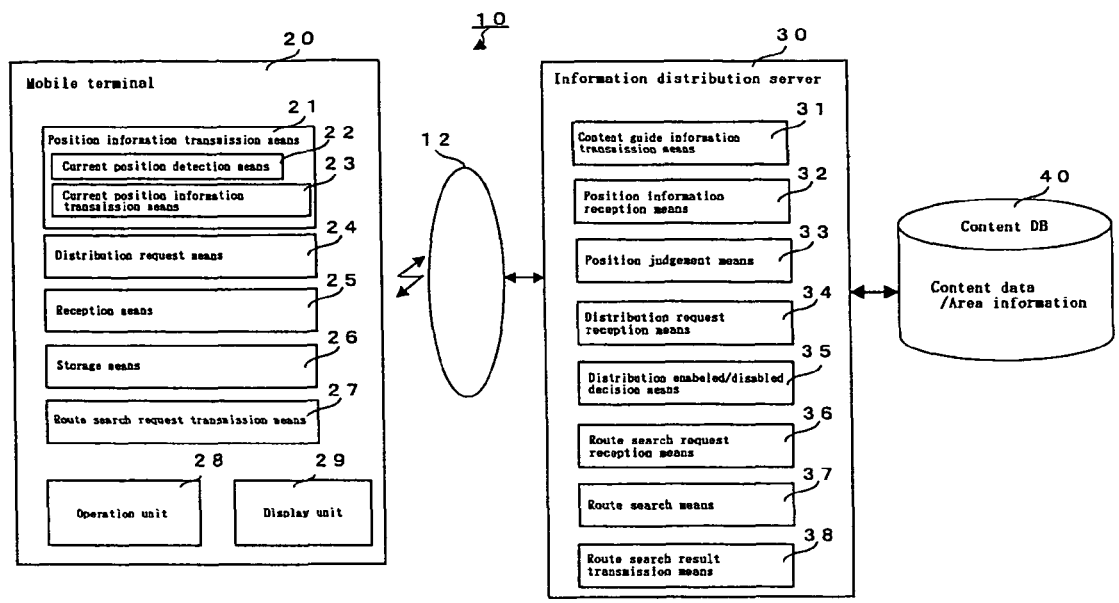
FIG. 1 is a schematic block diagram illustrating the configuration of an information distribution system of the present invention.
Figure 2:
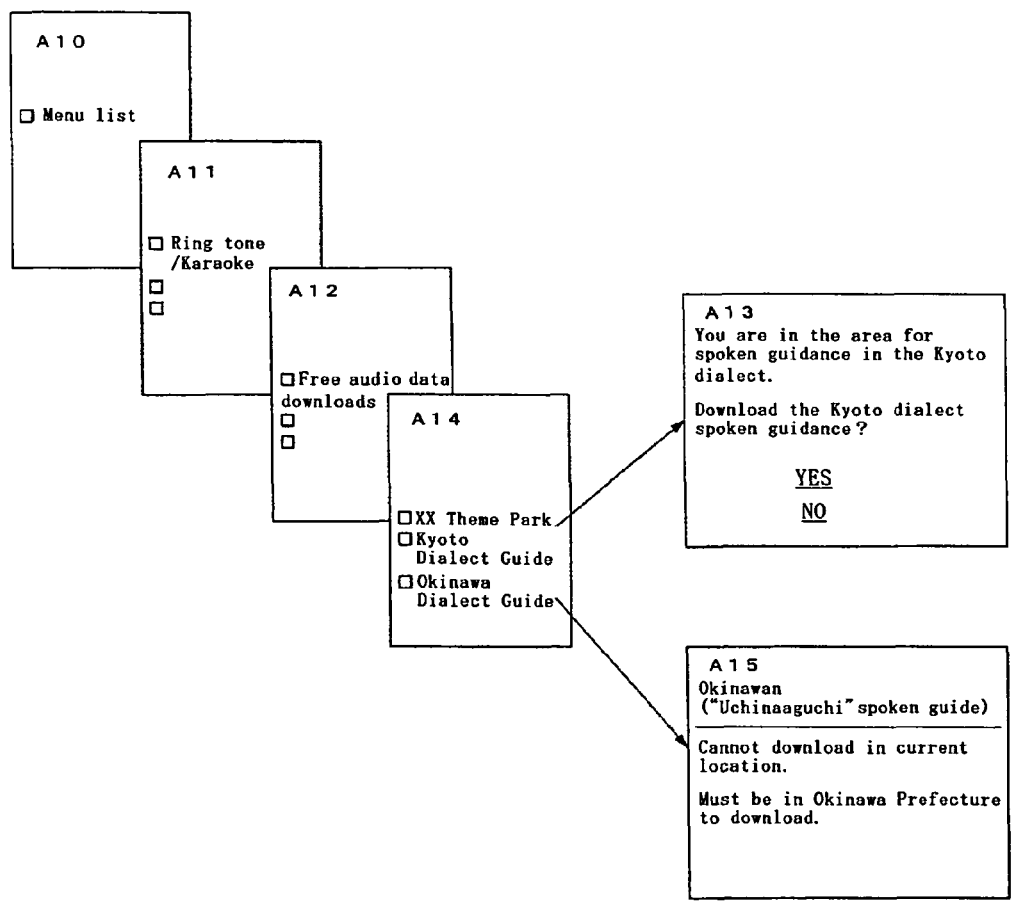
FIG. 2 is a conceptual diagram explicating the procedure by which information distribution is received from the information distribution server using the menu screen of the mobile terminal.
Figure 3:
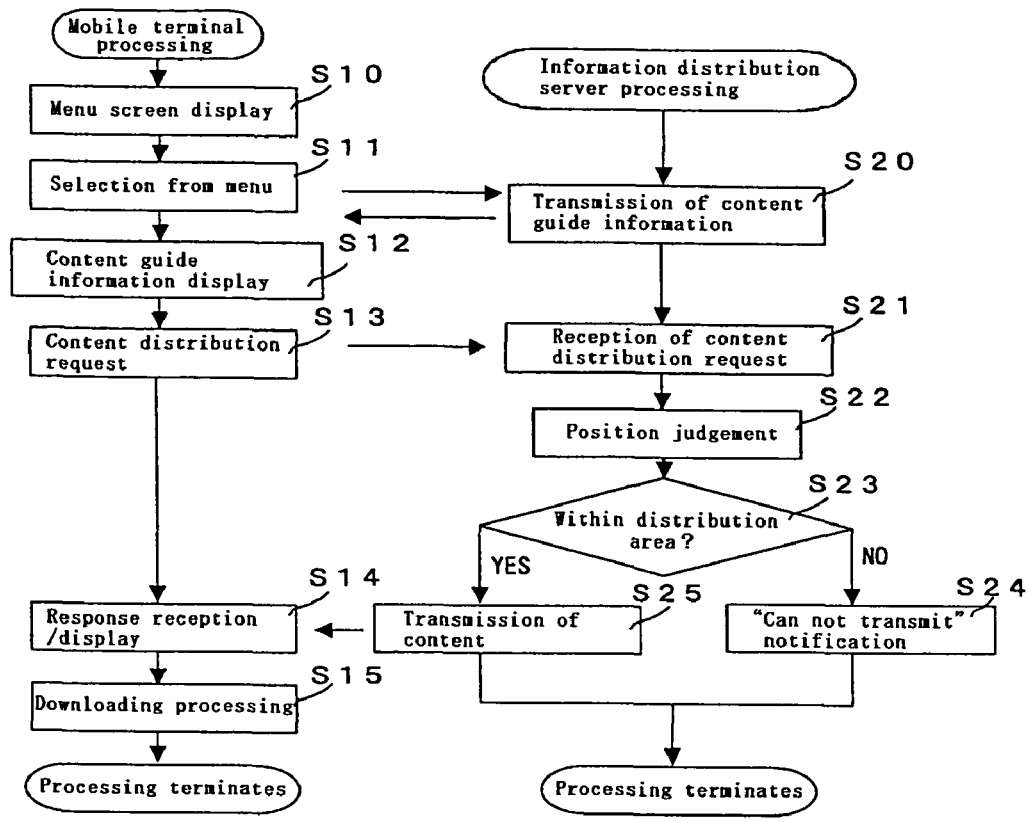
FIG. 3 is a flowchart illustrating the information distribution procedure shown in FIG. 2.
Figure 4:
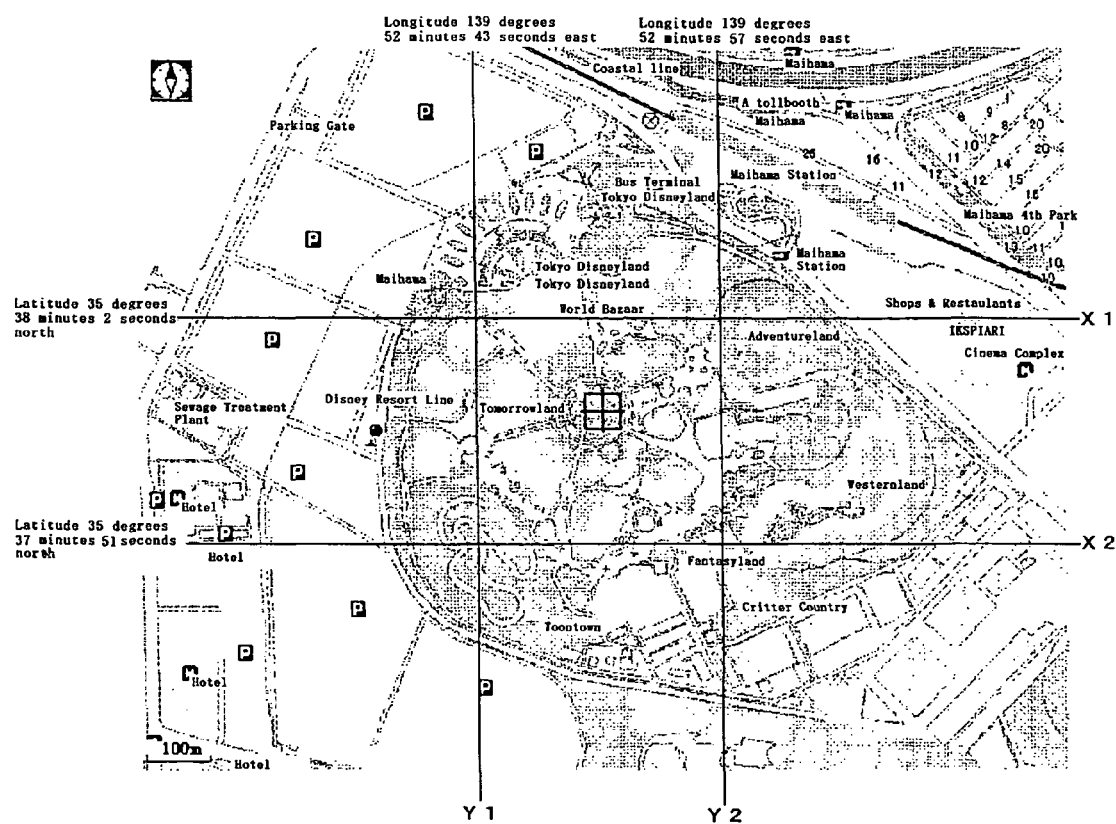
FIG. 4 is a map diagram explicating the method for setting a distribution area for content.
Figure 5:
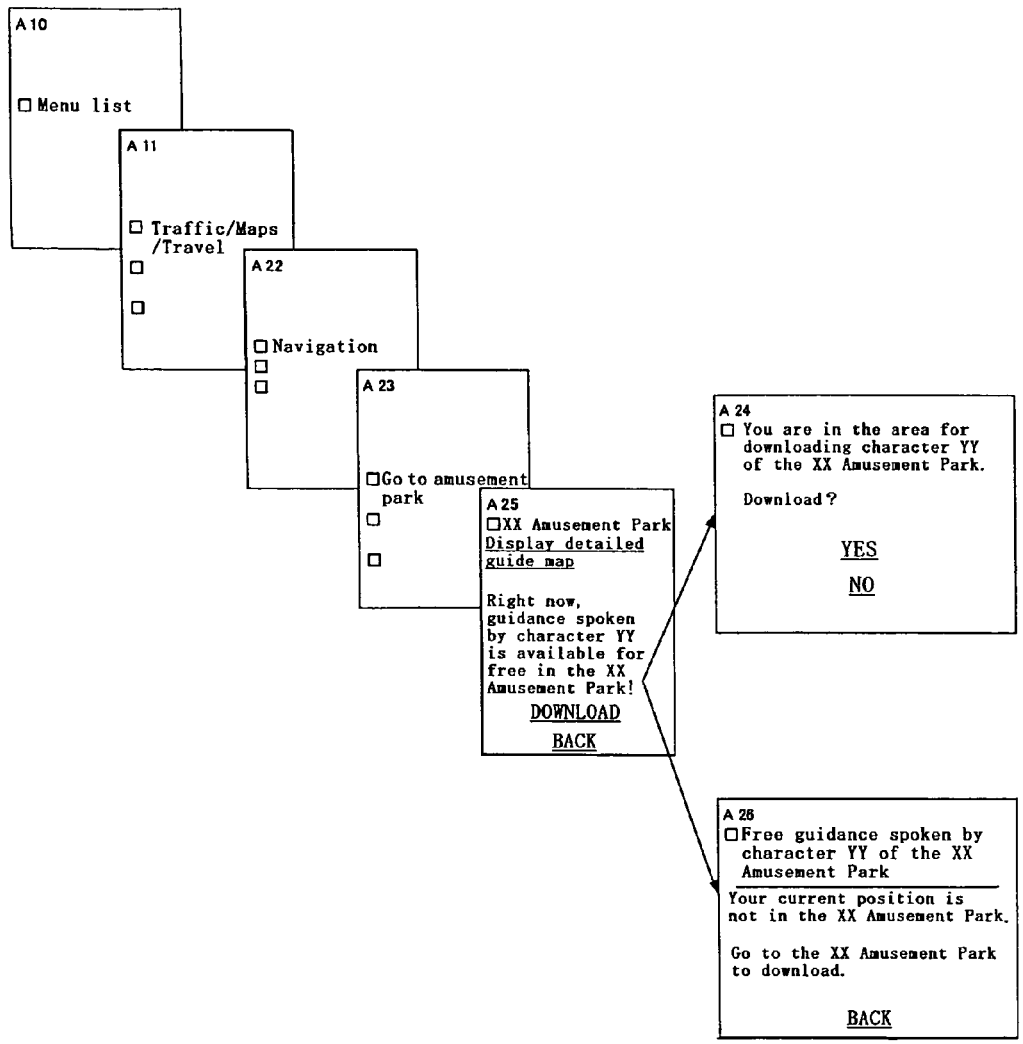
FIG. 5 is a conceptual diagram explicating the procedure for distributing content guide information for route guidance in response to a route search request.
Figure 6:
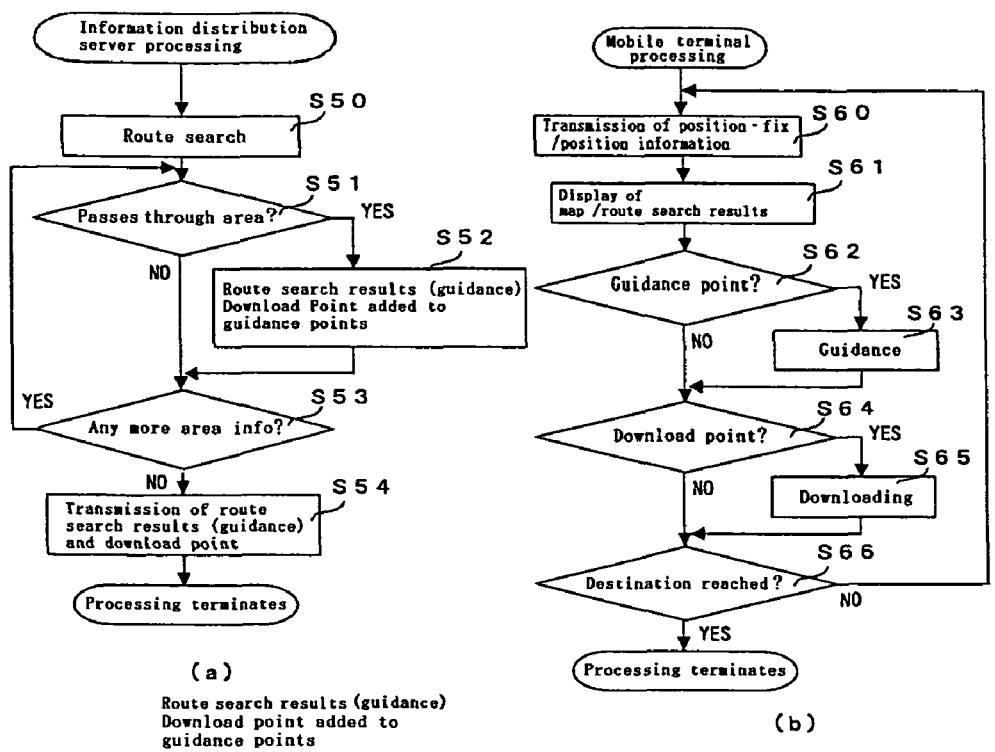
FIG. 6 presents flowcharts illustrating the procedure for distributing content guide information as download point data for route guidance, where FIG. 6(*a*) represents a flowchart illustrating the processing conducted by the information distribution server and FIG. 6(*b*) illustrates processing conducted by the mobile terminal.
Figure 7:
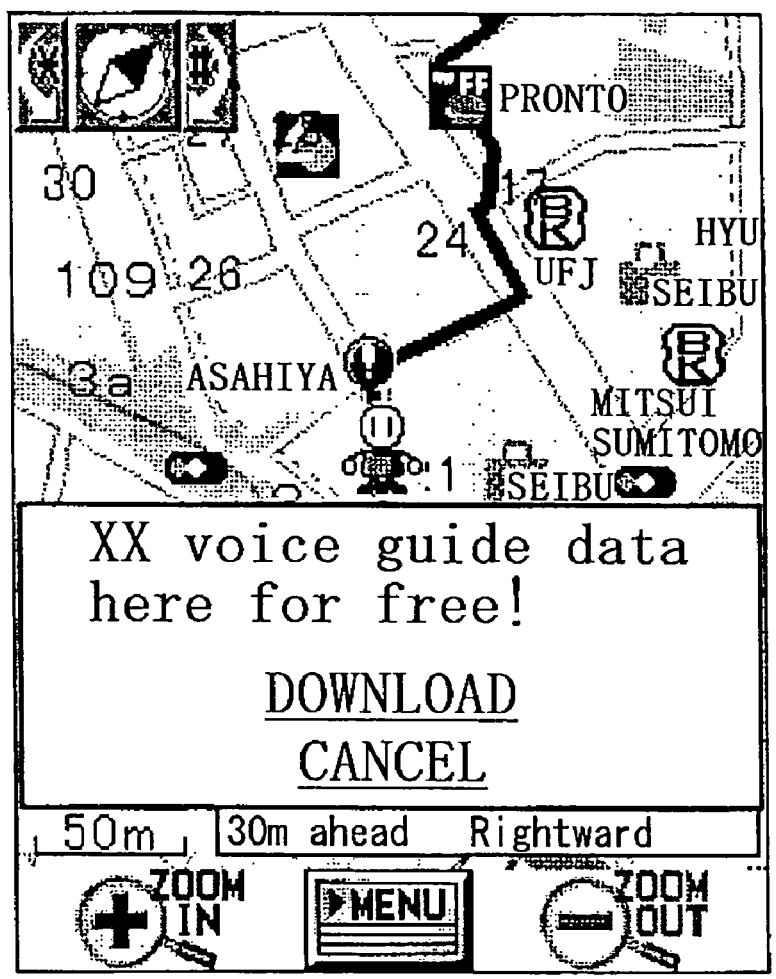
FIG. 7 is a picture of a display screen showing the download point data referred to in FIG. 6.
Figure 8:
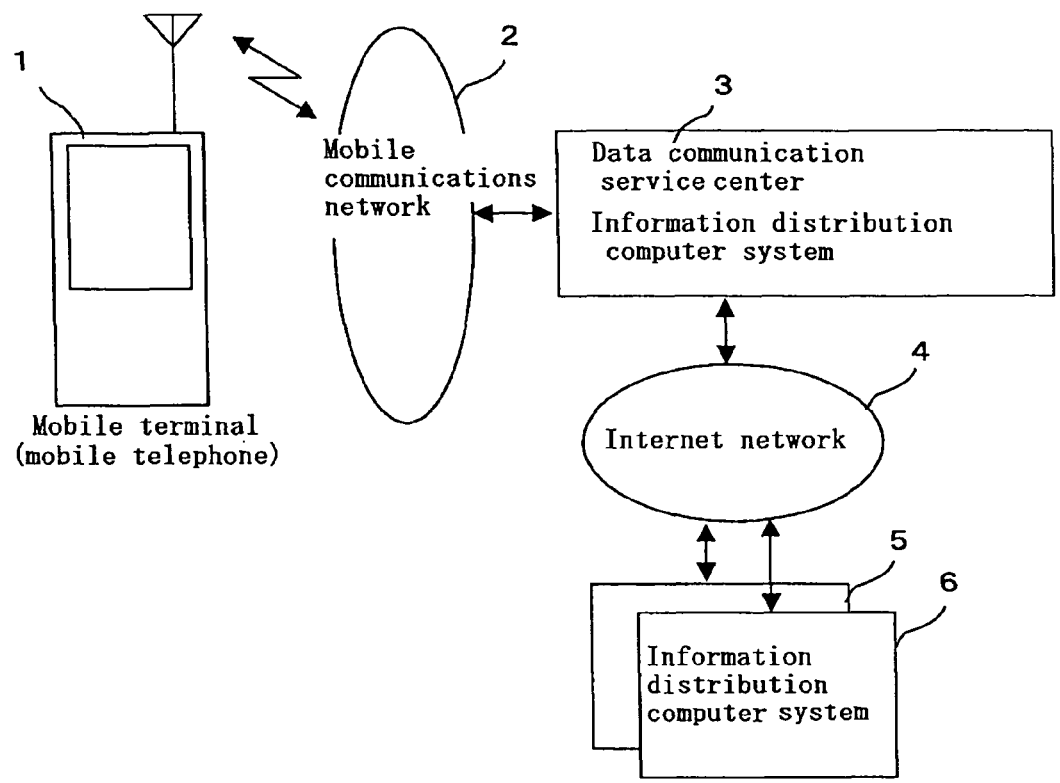
FIG. 8 is a schematic block diagram illustrating an example of a related art information distribution system.

Specific illustrative embodiments of the present invention will now be described in detail with reference to the drawings. FIG. 1 is a schematic block diagram illustrating the configuration of an information distribution system of the present invention. FIG. 2 is a conceptual diagram explicating the procedure by which information distribution is received from the information distribution server using the menu screen of the mobile terminal. FIG. 3 is a flowchart illustrating the information transmission procedure shown in FIG. 2, and FIG. 4 is a map diagram explicating the method for setting a distribution area for content. FIG. 5 is a conceptual diagram explicating the procedure for distributing content guide information for route guidance in response to a route search request, while FIG. 6 presents flowcharts illustrating the procedure for distributing content guide information as download point data for route guidance, where FIG. 6(a) represents a flowchart illustrating the processing conducted by the information distribution server and FIG. 6(b) illustrates processing conducted by the mobile terminal. FIG. 7 is a picture of a display screen showing the download point data referred to in FIG. 6.

First Embodiment

The information distribution system 10 of the first embodiment of the present invention will now be described. The information distribution system 10 of FIG. 1 represents an embodiment that applies the information distribution service of the present invention to a system offering route search and route guidance services, in a manner similar to the system disclosed in Patent Document 1. The mobile terminal 20 carries a GPS position-fixing device and is equipped with functions for transmitting information on the current position of the mobile terminal 20 to the information distribution server 30 and for making route search requests specifying the starting point and destination. The information distribution server 30 conducts route searches according to the route search requests and transmits the route search results (route guidance) to the mobile terminal 20.

As FIG. 1 shows, the information distribution system 10 includes an information distribution server 30 and a mobile terminal 20, such as a mobile telephone, that accesses the information distribution server 30 via a communications network 12. The information distribution server 30 is equipped with a content database (DB) 40, which associates and memorizes content downloadable to a mobile terminal 20, or content data indicating the registration location of such content, and area information indicating the specific area to which such content may be downloaded by the mobile terminal. The area information pertains to information indicating the area where specific content is to be distributed, specifying the area by, for example, delineation via latitude and longitude, and the content data associated with the area information will only be distributed if the mobile terminal 20 is situated within the area specified by the area information. Thus, the system is configured in such manner that when the user moves to and within a specific area he is able to receive distribution of specific content that pertains to such area as a distribution condition.

The information distribution server 30 is equipped with a content guide information transmission means 31 that transmits content guide information on the content data and/or area information to the mobile terminal 20; a position information reception means 32 for receiving position information transmitted from the mobile terminal 20; and a position judgment means 33 that determines the position of the mobile terminal 20 based on the position information received by the position information reception means 32. The information distribution server 30 is further equipped with a distribution request reception means 34 that receives content distribution requests from the mobile terminal 20, and a distribution enabled/disabled decision means 35 that checks the position of the mobile terminal 20 as determined by the position judgment means 33 against the area information when there is a content distribution request from the mobile terminal 20, and decides whether to distribute the requested content. The information distribution server 30 is additionally equipped with a route search request reception means 36, a route search means 37 and a route search result transmission means 38, through which the information distribution server 30 receives route search requests from the mobile terminal 20, conducts route searches, and distributes the route search results (route guidance) to the mobile terminal 20. The method for such route searching may employ the technology disclosed in Patent Document 1.

The mobile terminal 20 has an operation unit 28 provided with keys and buttons, etc., a display unit 29 including a liquid crystal display module, etc., and a position information transmission means 21. The position information transmission means 21 is composed of a current position detection means 22 including a GPS position-fixing device, and a current position information transmission means 23 that transmits current position information detected by the current position detection means 22 to the information distribution server 30. The information distribution server 30 determines the position of the mobile terminal according to the current position information transmitted from the current position information transmission means 23 of the mobile terminal 20. The mobile terminal 20 is further equipped with a distribution request means 24 for requesting distribution of desired content from the information distribution server 30; a reception means 25 for receiving content guide information and content data, etc., transmitted by the information distribution server 30; a storage means 26 that stores data received from the information distribution server 30 or other servers; and a route search request transmission means 27 that transmits route search requests to the information distribution server 30.

The structure of the information distribution system 10 of the present invention is not restricted to the above-described structure, as it could also be a system without navigation service functions, or the mobile terminal 20 could likewise be a mobile telephone without navigation service capability or a mobile telephone without a GPS position-fixing device. In the case of a mobile telephone 20 without a GPS position-fixing device, the means for transmitting the position registration signal to the base station would correspond to the position information transmission means 21, and the information distribution server 30 can thus obtain the mobile telephone position information registered at the base station via the position information reception means 32 and carry out position judgment via the position judgment means 33.

FIG. 2 is a conceptual diagram explicating the procedure for receiving an information transmission from the information distribution server 30 using the menu screen of a mobile terminal 20 which is a mobile telephone. First, as shown in FIG. 2, in order that the mobile terminal 20 can connect with the information distribution server 30 the operation unit 28 is activated in order to access and display the menu list A10 (main menu screen) on the display unit 29. From the menu list A10 one can, for example, go to page A11, where there is a Ring tone/Karaoke page. Then, by selecting the Free audio data downloads item A12, one can view a list of contents that can be downloaded for free, such as screen A14. Such list will include the content guide information sent from the information distribution server 30.

For example, in the case of the XX Theme Park item included in the A14 list, a service is offered whereby the voices of popular characters of that theme park will be downloaded for the audio guide of the route guidance. Together with the Kyoto Dialect Guide item, data can be downloaded with the route guidance audio being done in the Kyoto dialect. Similarly, with the Okinawa Dialect Guide item, data can be downloaded with the route guidance done in the Okinawa dialect. Assuming that the user of the mobile terminal 20 is in Kyoto, selecting Kyoto Dialect Guide in A14 will display a page to confirm downloading of audio data in the Kyoto dialect, such as screen A13 and if Okinawa Dialect Guide were selected, screen A14 will bring up a display to the effect that the download is not possible, since the current location is not Okinawa. This expresses the desire of the audio data's provider, for example the Tourist Association of Okinawa Prefecture, that the download service be made available only to people who come to Okinawa.

The procedure for providing the above-described information distribution service is realized through exchanges between the information distribution server 30 and the mobile terminal 20, as shown in the flowchart in FIG. 3. The processing involved in steps S10 to S15 in FIG. 3 represents processing conducted by the mobile terminal 20 while the processing involved in steps S20 to S25 represents processing performed by the information distribution server 30. By activating the operation unit 28 of the mobile terminal 20, a menu screen for the data communication services will be displayed to the user on the display unit 29 (step S10). The information in each stratum of menu screens A11 to A14 in FIG. 2 may refer to screen information that is prepared according to the content guide information sent in advance from the information distribution server 30 in step S20 and stored in the mobile terminal 20. Alternatively, the applicable screen information may be transmitted from the information distribution server 30 whenever a screen that contains content guide information is reached, for example screen A14 in FIG. 2, as going through the screen strata can be done by means of the operation unit 28 of the mobile terminal 20. In the case where pre-transmitted screens are stored in the mobile terminal 20, when there is an update to the screen information, processing that causes the updated screen information to be sent from the information distribution server 30 to the mobile terminal 20 the first time that the mobile terminal 20 selects the screen in question following the update, will be necessary.

In step S12, when the mobile terminal 20 displays screen A14 as shown in FIG. 2 and the user selects from this screen some content for downloading, for example, Kyoto Dialect Guidance, then a request for distribution of the content will be sent to the information distribution server 30, constituting step S13. Upon receiving the content transmission request in step S21, the information distribution server 30 will determine the position of the mobile terminal 20 in step S22. This position judgment is carried out according to the current position information pertaining to the mobile terminal 20 that was received by the position information reception means 32. This current position information refers to information on the current position of the mobile terminal 20 that it detected via the current position detection means 22 and transmitted through the current position information transmission means 23. Where the mobile terminal 20 is a mobile telephone that is not equipped with a GPS position-fixing device, the process of position registration that the mobile telephone implements with the base station may be employed, as mentioned earlier.

Next, in step S23, the information distribution server 30 checks whether the current position of the mobile terminal 20 is within the area specified in the area information associated with the content. If the current position of the mobile terminal 20 is not within the area specified as a distribution condition for the content whose distribution was requested, the information distribution server 30 will respond "Can not transmit" to the mobile terminal in step S24. If it is within such area, in step S25, content data such as the URL from which the content can be downloaded, the file name and serial number for the content stored there, and so forth, are sent to the mobile terminal 20. In step S14, the mobile terminal-20 displays the response received from the information distribution server 30. Then, in accordance with the content received, either A13 or A15 in FIG. 2 will be displayed. If the URL for downloading is sent, it would mean that reception has been approved, and as a result the mobile terminal 20 will execute content download processing in step S15, thus completing the series of processing functions.

Where the content consists of audio information such as voice guidance in the Kyoto or Okinawa dialect or of a specific character, the data is prepared in the same format as the standard voice guidance data and made to be substitutable for the standard voice guidance. Area information showing the area to which it is downloadable would be associated with this voice data file and memorized in the content DB 40. For example, the central portion of the area of the theme park in question will, as shown in FIG. 4, be delineated by latitude X1, X2 and longitude Y1, Y2 settings, and be associated as area information with the applicable content data, such that only a person who has entered the theme park can download the voice guidance data for the theme park's unique characters using the mobile terminal 20. Upon making a content distribution request to the information distribution server 30 while located within such area, the mobile terminal 20 will be able to receive distribution of the content data in question and download the content. The area set in the example in FIG. 4 extends over more than 300 meters square, which means that considering the accuracy of the GPS position-fixing device carried by the mobile terminal 20, the distribution condition will definitely be met.

In the case where the mobile terminal 20 has already downloaded the same content (data), a message such as "Already downloaded. Change voice guidance data?" could be displayed in step S14 if checking of the file name or serial number conducted by the mobile terminal 20 yields the result that the same data has been stored. Further, although the foregoing procedure pertains to an example where the information distribution server 30 has sent the URL through which the requested content or similar data could be downloaded to the mobile terminal 20, the configuration could alternatively be such that the content is downloaded from the information distribution server 30 directly to the mobile terminal 20 if the information distribution server 30 already holds such content.

Moreover, although the foregoing description refers to a situation where the mobile terminal 20 receives a "Can not transmit" response from the information distribution server 30 upon sending a content distribution request, thereby notifying the user that there is a distribution area limitation on the requested content, an alternative mode is possible whereby content guide information in the form of a list of contents may be instantly referred to and their distribution conditions are provided to the mobile terminal 20. If the content guide information is voluminous, a mode would be possible in which the contents are drawn up into genre-by-genre lists for selection.

Second Embodiment

FIG. 5 is a conceptual diagram illustrating the procedure for implementing distribution of content in combination with route search and route guidance in the information distribution system 10 of FIG. 1. As FIG. 5 shows, after the user moves from the menu list on the main menu screen A10 to screen A11 and thence to the navigation screen (page) A22, information on the current position of the mobile terminal is sent to notify the information distribution server 30. Then, when the amusement park is selected as destination from the categories displayed on screen A23, a screen A25 will be displayed to allow the user to select route guidance or map displays to reach the destination amusement park, together with POIs (points of interest) in the vicinity thereof. At this point, the information distribution server 30 will send content guide information to the mobile terminal 20, conveying that a content download service exists. If the mobile terminal 20 is in the area that permits the download, notification will be made of the fact that specific content can be downloaded upon a screen such as A24. On the other hand, if the user has not yet proceeded to or entered the area, a screen such as A26 will be displayed, notifying the user that it will be possible to download specific content if the specific area is proceeded to, thereby drawing the interest of the user. The processing in FIG. 5 can be carried out via a procedure similar to that shown by the flowchart in FIG. 3.

Third Embodiment

FIG. 6 presents flowcharts showing another mode of the information distribution system 10, where FIG. 6(a) represents a flowchart showing the processing conducted by the information distribution server 30 and FIG. 6(b) illustrates the processing conducted by the mobile terminal 20. This mode refers to a method whereby the information distribution server 30 adds content guidance information as a download point to the route search results and sends such information to the mobile terminal 20. In the route searching process, after receiving a route search request from the mobile terminal 20, the information distribution server 30 searches the content DB 40 item by item to determine whether the mobile terminal 20 is passing through an area for which content data has been established, and for every area through which the mobile terminal 20 passes, adds guidance information in advance on downloadable content as a download point to the route search results (route guidance), before distributing such information to the mobile terminal 20. In this manner, upon reaching the download point during the process of receiving the route guidance, the mobile terminal 20 will learn of the existence of downloadable content and be able to perform the processing to download such content.

More precisely, in step S50, the information distribution server 30 conducts route search in response to a route search request from the mobile terminal 20 and prepares route guidance data. During such process, in step S51, the information distribution server 30 consults the area information in the content DB 40 and searches the areas that the route, along which the mobile terminal 20 is to be guided, will pass through. If the mobile terminal 20 passes through any of the areas searched, guidance information on the content downloadable in such area is added as a download point to the route search results, guidance points or other data, in step S52. In step S53, the information distribution server 30 determines whether there is still any relevant area information and if so, returns to step S51 and repeats the processing up to step S53 until no more area information remains. If there is no more area information, then the information distribution server 30 transmits the route search results, guidance points or other data, plus the download point data, to the mobile terminal 20, thus terminating the processing, in step S54.

During the route guidance, in step S60, the mobile terminal 20 fixes the current position at particular intervals, transmits the position information to the information distribution server 30, and displays on the display unit 29 the map information and route search results transmitted from the information distribution server 30. For purposes of interpreting the route search results data, the technology disclosed in Patent Document 1 can be applied, in which case the information distribution server 30 will read out map data for a vector-style map display of the area around the positional coordinates corresponding to the route along which the mobile terminal 20 is to be guided, as well as guidance route data obtained in the route search. The information distribution server 30 will then convert such guidance route data into vector data for depicting roads in particular colors and incorporate such data into the map data, which will then be transmitted to the mobile terminal 20, the source of the route search request.

Moreover, guide point data for calling up voice guidance in relation to making right or left turns, etc., at intersections and similar instructions can be added at applicable intersection positions in the route guidance (route search results), and when the mobile terminal 20 reaches certain guide points, the particular voice guide will be called up to provide the user with spoken-guidance. Similarly, guidance information on the content downloadable within the area will be added at the applicable area positions in the route guidance as download point data. Thus, while receiving route guidance, the user can view particular content guide information via the download point data when he enters an area where downloadable content is offered, and processing to effect downloading of the content data can take place on the spot if the user is interested in such content.

More precisely, following the processing in step S61, if the mobile terminal 20 comes to a guidance point in step S62 while receiving route guidance, voice guidance will be called up in accordance with the data for the guidance point. For example, when an intersection is reached, the voice guidance for that intersection will be called up and it will be possible to receive spoken guidance on left or right turns, etc. In the absence of any guidance point, the mobile terminal 20 will proceed to step S64. If the mobile terminal 20 reaches a download point in step S64, guidance information on the content downloadable within the area will be displayed in accordance with the data for the download.

The display screen to be used is illustrated in FIG. 7, appearing together with vibration, sound effects and voice guidance, for example. The guidance route is displayed on the map, and "XX voice guide data here for free" is displayed as content guide information. This display is linked to the URL from which the content can be saved, and the content indicated can be downloaded to the mobile terminal 20 by selecting and confirming "Download", in step S65. On the other hand, by selecting and confirming "Cancel", the mobile terminal will move on to step S66 without any processing being performed. Further, if there is no download point in step S64, the mobile terminal 20 will proceed to step S66, and if the user has not yet reached his destination, the mobile terminal 20 will return to step S60 and continue the processing (route guidance) from step S60 to step S66 until the user finally reaches his destination, upon which, in step S66, the mobile terminal 20 will terminate the route guidance processing.

INDUSTRIAL APPLICABILITY

As described above, the present invention makes it possible, when the user bearing the mobile terminal 20 moves into a specific area, for the user to be notified of the fact that content specified for that area is downloadable, and to select and download the requisite content. Thus for example, people touring Kyoto will be able to receive guidance in the Kyoto dialect so that they can savor the local ambience to the full. Whereas the standard voice says "O-tsukare-sama deshita" when the destination is reached (here, approximately signifying Good work!), the Kyoto dialect version says "O-tsukare-san doshita". This will remain effective even after the user has departed Kyoto, so that the user will leave Kyoto with a good impression together with the memories. Moreover, when a certain time has passed the content will change and the audio message will be "Tanto aruite hokkori shiharimashita yaro" (You must be exhausted after so much walking) so that even after the data is updated it can remain fresh and provide amusement for the user.

Further, by offering the voices of popular characters in theme parks and the like, visitors can be attracted to visit through the lure of audio data. Since users will not be able to download such audio data unless they enter the park, it will be possible to achieve extremely high added-value for the system. In addition, the invention can also be utilized for giving out coupons and similar benefits by urging downloading during route guidance. Ordinary coupon distribution methods in the related art permit time limitations but are unable to provide local flavor. Under the conventional methods, it is problematic for establishments to implement a nation-wide service since seasonal festivities and school vacation periods differ from locality to locality. The present invention however will enable individual establishments to hand out coupons to people passing by regardless of the season.

Moreover, instead of the numbered entrance tickets given out by hand as previously mentioned, it will be possible to use the method of issuing electronic numbered tickets to people who come within the vicinity of the venue of an event. The information distribution server 30 is capable of managing the quantity of tickets issued and to whom they are issued, which will be highly convenient for patronizing establishments. Moreover, the data that may be downloaded is not limited to audio guidance data for navigation. For instance, the present invention may also be used to offer a so-called "Ring song", serving as the ring tone of a mobile telephone at concert venues or for people within the vicinity of a venue who were unable to get into the concert. Further, at soccer or baseball grounds, photographs of popular players could be distributed as standby screen data.

In addition, the application of the invention may even extend to various countries, as the invention may be employed to download particular languages in particular countries. Thus, users would be able to customize it to their own localities if exported to other regions such as the EU. There would be no erroneous data downloaded, since the scope of information would be limited to each locality. Areas are not limited to rectangular shapes defined by latitude and longitude. More complex shapes could be formed by combining rectangles, and linking the same data to each other. If the serial numbers assigned to content files are made identical, duplicated downloading of the files will not occur even if they are divided among several areas.

What is claimed is:

1. An information distribution system comprising: an information distribution server and a mobile telephones, Personal Handyphone System ("PHS") devices and other mobile communication terminal equipment, where the information distribution server is equipped with a content database that associates and memorizes content downloadable to the mobile telephones, Personal Handyphone System ("PHS") devices and other mobile communication terminal equipment, or content data indicating the registration location of such content, and area information indicating the specific geographical area to which such content may be downloaded by the mobile telephones, Personal Handyphone System ("PHS") devices and other mobile communication terminal equipment; and where the information distribution server is equipped with:

a content guide information distribution means that transmits a content guide information associating the content downloadable to the mobile telephones, Personal Handyphone System ("PHS") devices and other mobile communication terminal equipment with the geographical area to which such content may be downloaded to the mobile telephones, Personal Handyphone System ("PHS") devices and other mobile communication terminal equipment;

a distribution request reception means that receives content distribution requests from the mobile telephones, Personal Handyphone System ("PHS") devices and other mobile communication terminal equipment;

a position judgment means that determines the position of the mobile telephones, Personal Handyphone System ("PHS") devices and other mobile communication terminal equipment; and a distribution enabled/disabled decision means that checks the position of the mobile telephones, Personal Handyphone System ("PHS") devices and other mobile communication terminal equipment determined by the position judgment means against the area information associated with the content whose distribution is requested, and decides whether to distribute the content in question;

and where the mobile telephones, Personal Handyphone System ("PHS") devices and other mobile communication terminal equipment is equipped with:

a display unit that displays a menu list for selecting a desirable item from within plural items;

a position information transmission means that sends information on the current position of the mobile telephones, Personal Handyphone System ("PHS") devices and other mobile communication terminal equipment to the information distribution server; and a distribution request means that makes distribution requests to the information distribution server and selects content to be downloaded according to the content guide information distributed by the information distribution server;

and the system is configured in such manner that the mobile telephones, Personal Handyphone System ("PHS") devices and other mobile communication terminal equipment acquires the content guide information associating the content corresponding to the selected item in the menu list with the geographical area to which such content may be downloaded, from the information distribution server and, in case of acquiring a specific content on the content guide information, unless the specific content is a content that is distributed in a geographical area including the current position, the distribution request means transmits the distribution request of the specific content along with the information on the current position to the information distribution server when the mobile telephones, Personal Handyphone System ("PHS") devices and other mobile communication terminal equipment moves to a geographical area where the specific content is distributed, and that when the information distribution server receives the distribution request of the content being selected based on the content guide information from the mobile telephones, Personal Handyphone System ("PHS") devices and other mobile communication terminal equipment, if the area information associated with the content whose distribution is requested matches the position of the mobile telephones, Personal Handyphone System ("PHS") devices and other mobile communication terminal equipment, the information distribution server distributes the content in question to the mobile telephones, Personal Handyphone System ("PHS") devices and other mobile communication terminal equipment, wherein the content guide information is transmitted from the information distribution server to the mobile telephones, Personal Handyphone System ("PHS") devices and other mobile communication terminal equipment in advance of the information distribution server distributing the content in question to the mobile telephones, Personal Handyphone System ("PHS") and other mobile communication terminal equipment, wherein a distribution request for said content in question is made based on and after the content guide information is received by mobile telephones, Personal Handyphone System ("PHS") and other mobile communication terminal equipment, wherein the position information transmission means comprises a current position detection means and a current position information transmission means that transmits current position information generated by the current position detection means, and wherein the position judgment means determines the current position of the mobile telephones, Personal Handyphone System ("PHS") devices and other mobile communication terminal equipment according to current position information received from the mobile telephones, Personal Handyphone System ("PHS") devices and other mobile communication terminal equipment in question.

2. An information distribution server comprising:

a content database that associates and memorizes content downloadable to a mobile telephones, Personal Handyphone System ("PHS") devices and other mobile communication terminal equipment, or content data indicating the registration location of such content, and area information indicating the specific geographical area to which such content may be downloaded by the mobile telephones, Personal Handyphone System ("PHS") devices and other mobile communication terminal equipment, and distributes the content requested by the mobile telephones, Personal Handyphone System ("PHS") devices and other mobile communication terminal equipment;

a content guide information distribution means that distributes guidance information to the mobile telephones, Personal Handyphone System ("PHS") devices and other mobile communication terminal equipment on the content downloadable by the mobile telephones, Personal Handyphone System ("PHS") devices and other mobile communication terminal equipment;

a distribution request reception means that receives content distribution requests from the mobile telephones, Personal Handyphone System ("PHS") devices and other mobile communication terminal equipment;

a position judgment means that determines the position of the mobile telephones, Personal Handyphone System ("PHS") devices and other mobile communication terminal equipment; and a distribution enabled/disabled decision means that checks the position of the mobile telephones, Personal Handyphone System ("PHS") devices and other mobile communication terminal equipment as determined by the position judgment means against the area information associated with the content whose distribution is requested and decides whether to distribute the content data in question;

and where the mobile telephones, Personal Handyphone System ("PHS") devices and other mobile communication terminal equipment is equipped with:

a display unit that displays a menu list for selecting a desirable item from within plural items;

a position information transmission means that transmits information on the current position of the mobile telephones, Personal Handyphone System ("PHS") devices and other mobile communication terminal equipment to the information distribution server; and a distribution request means that makes distribution requests to the information distribution server and selects content to be downloaded according to the content guide information distributed by the information distribution server;

and where the mobile telephones, Personal Handyphone System ("PHS") devices and other mobile communication terminal equipment acquires the content guide information associating the content corresponding to the selected item in the menu list with the geographical area to which such content may be downloaded, from the information distribution server and, in case of acquiring a specific content on the content guide information, unless the specific content is a content that is distributed in a geographical area including the current position, the distribution request means transmits the distribution request of the specific content along with the information on the current position to the information distribution server when the mobile telephones, Personal Handyphone System ("PHS") devices and other mobile communication terminal equipment moves to a geographical area where the specific content is distributed, and the information distribution server is configured in such manner that when the information distribution server receives the distribution request of the content being selected based on the content guide information from the mobile telephones, Personal Handyphone System ("PHS") devices and other mobile communication terminal equipment, if the area information associated with the content whose distribution is requested matches the position of the mobile telephones, Personal Handyphone System ("PHS") devices and other mobile communication terminal equipment, the information distribution server transmits the content in question to the mobile telephones, Personal Handyphone System ("PHS") devices and other mobile communication terminal equipment, wherein the content guide information is transmitted from the information distribution server to the mobile telephones, Personal Handyphone System ("PHS") devices and other mobile communication terminal equipment in advance of the information distribution server distributing the content in question to the mobile telephones, Personal Handyphone System ("PHS") and other mobile communication terminal equipment, wherein a distribution request for said content in question is made based on and after the content guide information is received by mobile telephones, Personal Handyphone System ("PHS") and other mobile communication terminal equipment, and wherein the information distribution server is equipped with a current position information reception means that receives current position information generated by the mobile telephones, Personal Handyphone System ("PHS") devices and other mobile communication terminal equipment according to the output of the current position detection means, and the position judgment means determines the current position of the mobile telephones, Personal Handyphone System ("PHS") devices and other mobile communication terminal equipment according to current position information received from the mobile telephones, Personal Handyphone System ("PHS") devices and other mobile communication terminal equipment in question.

3. A mobile telephones, Personal Handyphone System ("PHS") devices and other mobile communication terminal equipment that receives any desired content from an information distribution server equipped with a content database that associates and memorizes content downloadable to a mobile telephones, Personal Handyphone System ("PHS") devices and other mobile communication terminal equipment, or content data indicating the registration location of such content, and area information indicating the specific geographical area to which such content may be downloaded by the mobile telephones, Personal Handyphone System ("PHS") devices and other mobile communication terminal equipment, comprising:

a display unit that displays a menu list for selecting a desired item from within plural items;

a position information transmission means that sends information on the current position of the mobile telephones, Personal Handyphone System ("PHS") devices and other mobile communication terminal equipment to the information distribution server;

a distribution request means that makes distribution requests to the information distribution server and selects content to be downloaded according to the content guide information distributed by the information distribution server; and a receiving means that receives content that is distributed to the mobile telephones, Personal Handyphone System ("PHS") devices and other mobile communication terminal equipment when the information distribution server receives the distribution request of the content being selected based on the content guide information from the mobile telephones, Personal Handyphone System ("PHS") devices and other mobile communication terminal equipment, checks the position of the mobile telephones, Personal Handyphone System ("PHS") devices and other mobile communication terminal equipment against the area information associated with the content whose distribution is requested and determines that the mobile telephones, Personal Handyphone System ("PHS") devices and other mobile communication terminal equipment is situated in a geographical area that matches the area information;

where the mobile telephones, Personal Handyphone System ("PHS") devices and other mobile communication terminal equipment acquires the content guide information associating the content corresponding to the selected item in the menu list with the geographical area to which such content may be downloaded, from the information distribution server and, in case of acquiring a specific content on the content guide information, unless the specific content is a content that is distributed in a geographical area including the current position, the distribution request means transmits the distribution request of the specific content along with the information on the current position to the information distribution server when the mobile telephones, Personal Handyphone System ("PHS") devices and other mobile communication terminal equipment moves to a geographical area where the specific content is distributed, wherein the content guide information is transmitted from the information distribution server to the mobile telephones, Personal Handyphone System ("PHS") devices and other mobile communication terminal equipment in advance of the information distribution server distributing the content in question to the mobile telephones, Personal Handyphone System ("PHS") and other mobile communication terminal equipment, wherein a distribution request for said content in question is made based on and after the content guide information is received by mobile telephones, Personal Handyphone System ("PHS") and other mobile communication terminal equipment, and wherein the position information transmission means comprises a current position detection means and a current position information transmission means that transmits current position information generated by the output of the current position detection means.

4. An information distribution method for distributing information between a mobile telephones, Personal Handyphone System ("PHS") devices and other mobile communication terminal equipment and an information distribution server equipped with a content database that associates and memorizes content downloadable to the mobile telephones, Personal Handyphone System ("PHS") devices and other mobile communication terminal equipment, or content data indicating the registration location of such content, and area information indicating the specific geographical area to which such content may be downloaded by the mobile telephones, Personal Handyphone System ("PHS") devices and other mobile communication terminal equipment, comprising the following steps executed by the information distribution server:

a step in which a content guide information associating the content downloadable to a mobile telephones, Personal Handyphone System ("PHS") devices and other mobile communication terminal equipment with the geographical area to which such content may be downloaded is distributed to the mobile telephones, Personal Handyphone System ("PHS") devices and other mobile communication terminal equipment;

a step in which a content distribution request is received from the mobile telephones, Personal Handyphone System ("PHS") devices and other mobile communication terminal equipment;

a step in which the position of the mobile telephones, Personal Handyphone System ("PHS") devices and other mobile communication terminal equipment is determined;

a step in which the position of the mobile telephones, Personal Handyphone System ("PHS") devices and other mobile communication terminal equipment as determined by the position judgment means is checked against the area information associated with the content whose distribution is requested and decision is made whether to distribute the content in question; and a step in which the content is distributed to the mobile telephones, Personal Handyphone System ("PHS") devices and other mobile communication terminal equipment in accordance with the judgment result;

as well as the following steps executed by the mobile telephones, Personal Handyphone System ("PHS") devices and other mobile communication terminal equipment equipped with a display unit that displays a menu list for selecting a desirable item from within plural items, a position information transmission means that transmits information on the current position of the mobile telephones, Personal Handyphone System ("PHS") devices and other mobile communication terminal equipment to the information distribution server and a distribution request means that makes distribution requests to the information distribution server and selects content to be downloaded according to the content guide information distributed by the information distribution server:

a step in which the content guide information associating the content corresponding to the selected item in the menu list with the geographical area to which such content may be downloaded is acquired from the information distribution server; and a step in which in case of acquiring a specific content on the content guide information, unless the specific content is a content that is distributed in a geographical area including the current position, the distribution request of the specific content along with the information on the current position is transmitted to the information distribution server when the mobile telephones, Personal Handyphone System ("PHS") devices and other mobile communication terminal equipment moves to a geographical area where the specific content is distributed;

wherein the content guide information is transmitted from the information distribution server to the mobile telephones, Personal Handyphone System ("PHS") devices and other mobile communication terminal equipment in advance of the information distribution server distributing the content in question to the mobile telephones, Personal Handyphone System ("PHS") and other mobile communication terminal equipment, wherein a distribution request for said content in question is made based on and after the content guide information is received by mobile telephones, Personal Handyphone System ("PHS") and other mobile communication terminal equipment, and wherein the mobile telephones, Personal Handyphone System ("PHS") devices and other mobile communication terminal equipment further executes:

a step in which the current position of the mobile telephones, Personal Handyphone System ("PHS") devices and other mobile communication terminal equipment is determined; and a step in which the current position information generated by the current position detection means is transmitted to the information distribution server; and the information distribution server further executes:

a step in which the current position of the mobile telephones, Personal Handyphone System ("PHS") devices and other mobile communication terminal equipment is determined according to the current position information received from the mobile telephones, Personal Handyphone System ("PHS") devices and other mobile communication terminal equipment in question.

5. An information distribution method employing an information distribution server equipped with a content database that associates and memorizes content downloadable to a mobile telephones, Personal Handyphone System ("PHS") devices and other mobile communication terminal equipment which displays a menu list for selecting a desired item from within plural items, or content data indicating the registration location of such content, and area information indicating the specific geographical area to which such content may be downloaded by the mobile telephones, Personal Handyphone System ("PHS") devices and other mobile communication terminal equipment, and distributes the content requested by the mobile telephones, Personal Handyphone System ("PHS") devices and other mobile communication terminal equipment, comprising the following steps executed by the information distribution server:

step in which a content guide information associating the content downloadable to a mobile telephones, Personal Handyphone System ("PHS") devices and other mobile communication terminal equipment with the geographical area to which such content may be downloaded is distributed to the mobile telephones, Personal Handyphone System ("PHS") devices and other mobile communication terminal equipment according to the selected item in the menu list of the mobile telephones, Personal Handyphone System ("PHS") devices and other mobile communication terminal equipment;

a step in which the content guide information corresponding to the selected item in the menu list is acquired from the information distribution server and in case of acquiring a specific content on the content guide information, unless the specific content is a content that is distributed in a geographical area including the current position, a content distribution request transmitted from the mobile telephones, Personal Handyphone System ("PHS") devices and other mobile communication terminal equipment is received along with the information on the current position when the mobile telephones, Personal Handyphone System ("PHS") devices and other mobile communication terminal equipment moves to a geographical area where the specific content is distributed;

a step in which the position of the mobile telephones, Personal Handyphone System ("PHS") devices and other mobile communication terminal equipment is determined;

a step in which the position of the mobile telephones, Personal Handyphone System ("PHS") devices and other mobile communication terminal equipment as determined by the position judgment means is checked against the area information associated with the content whose distribution is requested and a decision is made whether to distribute the content in question; and a step in which the content is distributed to the mobile telephones, Personal Handyphone System ("PHS") devices and other mobile communication terminal equipment in accordance with the judgment result, wherein the content guide information is transmitted from the information distribution server to the mobile telephones, Personal Handyphone System ("PHS") devices and other mobile communication terminal equipment in advance of the information distribution server distributing the content in question to the mobile telephones, Personal Handyphone System ("PHS") and other mobile communication terminal equipment, wherein a distribution request for said content in question is made based on and after the content guide information is received by mobile telephones, Personal Handyphone System ("PHS") and other mobile communication terminal equipment, wherein the information distribution server executes a further step whereby current position information generated by the mobile telephones, Personal Handyphone System ("PHS") devices and other mobile communication terminal equipment according to the output of the current position detection means is received, and the current position of the mobile telephones, Personal Handyphone System ("PHS") devices and other mobile communication terminal equipment in question is determined according to the current position information received.

* * * * *